United States Patent
Chen (10) Patent No.: US 7,292,018 B2
(45) Date of Patent: Nov. 6, 2007

(54) REVERSE CURRENT PREVENTING CIRCUIT WITH AN AUTOMATIC CORRECTION OF REFERENCE

(75) Inventor: Yung-Chih Chen, Pingtung County (TW)

(73) Assignee: Aimtron Technology Corp., Hsinchu (TW)

(*) Notice: Subject to any disclaimer, the term of this patent is extended or adjusted under 35 U.S.C. 154(b) by 84 days.

(21) Appl. No.: 11/278,965

(22) Filed: Apr. 7, 2006

(65) Prior Publication Data

US 2007/0236971 A1    Oct. 11, 2007

(51) Int. Cl.
G05F 1/40 (2006.01)
G05F 1/56 (2006.01)
G05F 1/10 (2006.01)
H02H 7/00 (2006.01)

(52) U.S. Cl. .................. 323/282; 323/222; 323/283; 323/285

(58) Field of Classification Search ........... 323/222, 323/223, 225, 268, 271, 282, 283, 285; 363/50, 363/55, 56.01, 56.02; 361/18
See application file for complete search history.

(56) References Cited

U.S. PATENT DOCUMENTS

| | | | |
|---|---|---|---|
| 5,481,178 A | 1/1996 | Wilcox et al. | |
| 6,396,250 B1 | 5/2002 | Bridge | |
| 6,538,418 B2 | 3/2003 | Miyazaki | |
| 6,541,947 B1 | 4/2003 | Dittmer et al. | |
| 6,707,281 B2 | 3/2004 | Solivan | |
| 6,815,939 B2 | 11/2004 | Umemoto et al. | |
| 6,873,140 B2* | 3/2005 | Saggini et al. | 323/283 |
| 6,922,042 B2* | 7/2005 | Umemoto et al. | 323/283 |
| 7,061,213 B2* | 6/2006 | Yoshida | 323/224 |
| 7,193,401 B1* | 3/2007 | Hasegawa | 323/283 |
| 7,242,170 B1* | 7/2007 | Natsume | 323/222 |
| 2005/0194951 A1* | 9/2005 | Mehas et al. | 323/282 |
| 2007/0090818 A1* | 4/2007 | Nishimori | 323/282 |

OTHER PUBLICATIONS

Steve Mappus, "Predictive Gate Drive™ Boosts Synchronous DC/DC Power Converter Efficiency". Application Report, Apr. 2003, pp. 1-25, SLUA281, Texas Instruments, Dallas, Texas.

* cited by examiner

*Primary Examiner*—Matthew V. Nguyen
(74) *Attorney, Agent, or Firm*—Winston Hsu (57) ABSTRACT

A synchronous switching voltage converter has a first switch, a second switch, and an inductor, coupled together to a switch node. A reverse current preventing circuit has a fixed reference current source, a correcting circuit, a variable reference current generating circuit, and a comparing circuit. Based on a comparison between an inductor current and the fixed reference current source, the correcting circuit generates a correcting signal. The variable reference current generating circuit generates a variable reference current signal, which is adjusted in accordance with the correcting signal. Based on a comparison between the inductor current and the variable reference current signal, the comparing circuit applies a preventing signal to the second switch so as to turn off the second switch.

20 Claims, 6 Drawing Sheets

REVERSE CURRENT PREVENTING CIRCUIT WITH AN AUTOMATIC CORRECTION OF REFERENCE

BACKGROUND OF THE INVENTION

1. Field of the Invention

The present invention relates to a reverse current preventing circuit and, more particularly, to a reverse current preventing circuit, which is applied in a synchronous switching voltage converter, with an automatic correction of reference so as to accurately prevent occurrence of current reversal.

2. Description of the Related Art

Figure 1A:
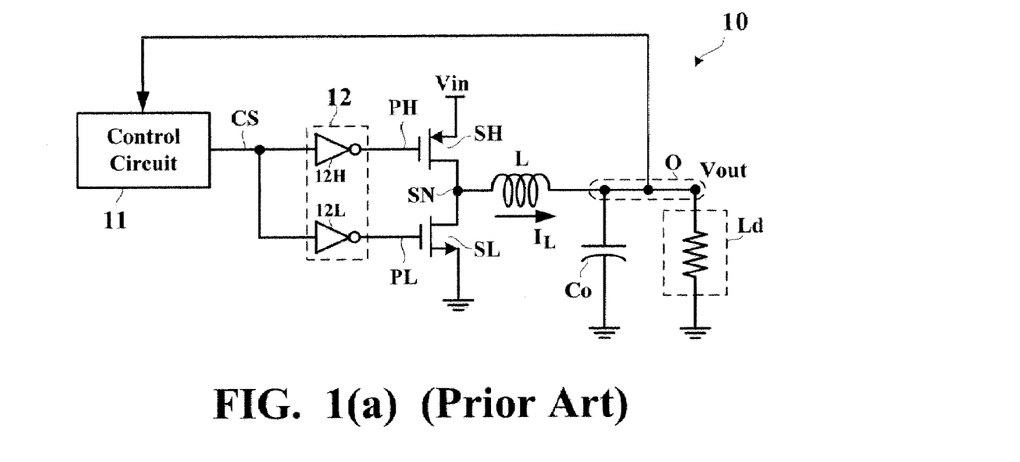
FIG. 1(a) is a circuit diagram showing a conventional synchronous switching voltage converter.

FIG. 1(a) is a circuit diagram showing a conventional synchronous switching voltage converter 10. The synchronous switching voltage converter 10 converts an input voltage source $V_{in}$ into a regulated output voltage $V_{out}$ for being supplied to a load Ld. A high-side switch SH is coupled between the input voltage source $V_{in}$ and a switch node SN, while a low-side switch SL is coupled between the switch node SN and a ground potential. In the example shown in FIG. 1(a), the high-side switch SH is implemented by a PMOS transistor while the low-side switch SL is implemented by an NMOS transistor. An inductor L is coupled between the switch node SN and an output terminal O. A control circuit 11 applies a switch control signal CS to a driving circuit 12 for generating a high-side driving signal PH and a low-side driving signal PL. The high-side driving signal PH turns ON/OFF the high-side switch SH, while the low-side driving signal PL turns ON/OFF the low-side switch SL. In response to the feedback of the output voltage $V_{out}$, the control circuit 11 adjusts the duty cycle of the switch control signal CS so as to regulate the output voltage $V_{out}$. Furthermore, an output capacitor CO is coupled to the output terminal O so as to filter ripples of the output voltage $V_{out}$.

Figure 1B:
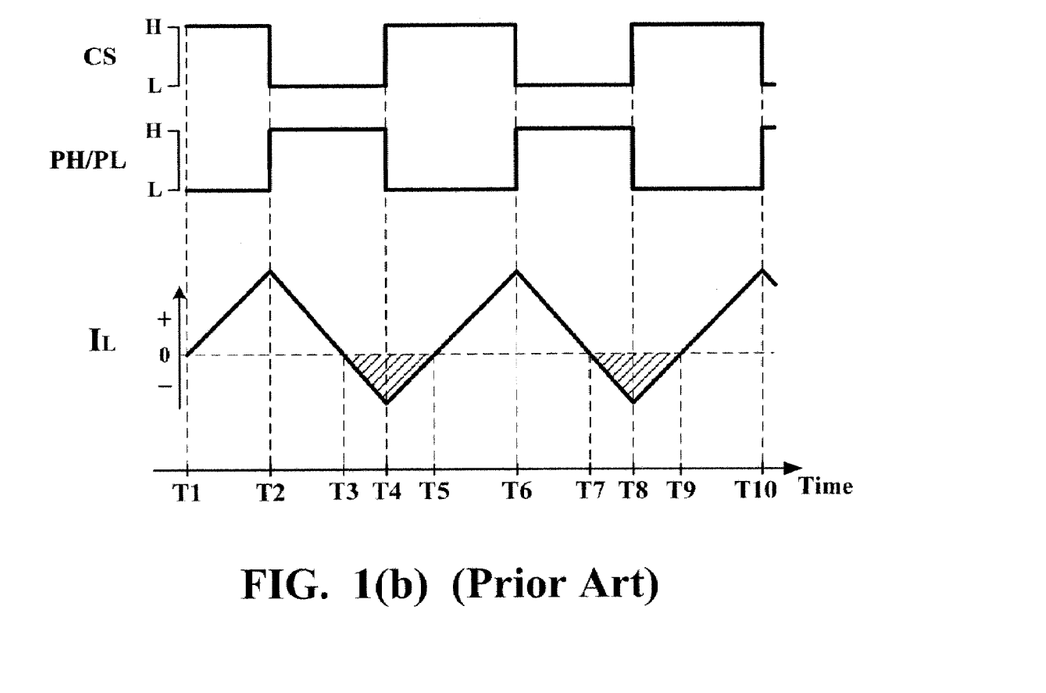
FIG. 1(b) is a waveform timing chart showing an operation of a conventional synchronous switching voltage converter.

FIG. 1(b) is a waveform timing chart showing an operation of a conventional synchronous switching voltage converter 10. Through a high-side driving circuit SH and a low-side driving circuit SL, respectively, the switch control signal CS is inverted into the high-side driving signal PH and the low-side driving signal PL. During a phase from time T1 to T2, the high-side driving signal PH and the low-side driving signal PL are both at the LOW level, so the high-side switch SH is turned ON and the low-side switch SL is turned OFF such that the direction of the inductor current $I_L$ is from the switch node SN to the output terminal O (such direction is defined as the positive direction hereinafter) and the absolute value of the inductor current $I_L$ gradually increases. During a phase from time T2 to T4, the high-side driving signal PH and the low-side driving signal PL are both at the HIGH level, so the high-side switch SH is turned OFF and the low-side switch SL is turned ON such that the absolute value of the inductor current $I_L$ gradually decreases. It should be noted that at time T3 the absolute value of the inductor current $I_L$ decreases to zero, so from time T3 to T4 the direction of the inductor current $I_L$ is reversed to become from the output terminal O to the switch node SN (such direction is defined as the negative direction hereinafter). During a phase from time T4 to T6, the high-side driving signal PH and the low-side driving signal PL are both at the LOW level, so the high-side switch SH is turned ON and the low-side switch SL is turned OFF. Since at this moment the direction of the inductor current $I_L$ is negative, the absolute value of the inductor current $I_L$ gradually decreases. From time T5 on, the direction of the inductor current $I_L$ becomes positive again and the absolute value of the inductor current $I_L$ gradually increases.

In FIG. 1(b), the hatched regions indicate the phenomenon of the current reversal. When the inductor current $I_L$ is flowing along the direction from the output terminal O to the switch node SN, energy is reversely supplied from the load Ld to the synchronous switching voltage converter 10. Since the current reversal causes the efficiency of the synchronous switching voltage converter 10 to be reduced, it is necessary to prevent the occurrence of the current reversal.

Figure 2A:
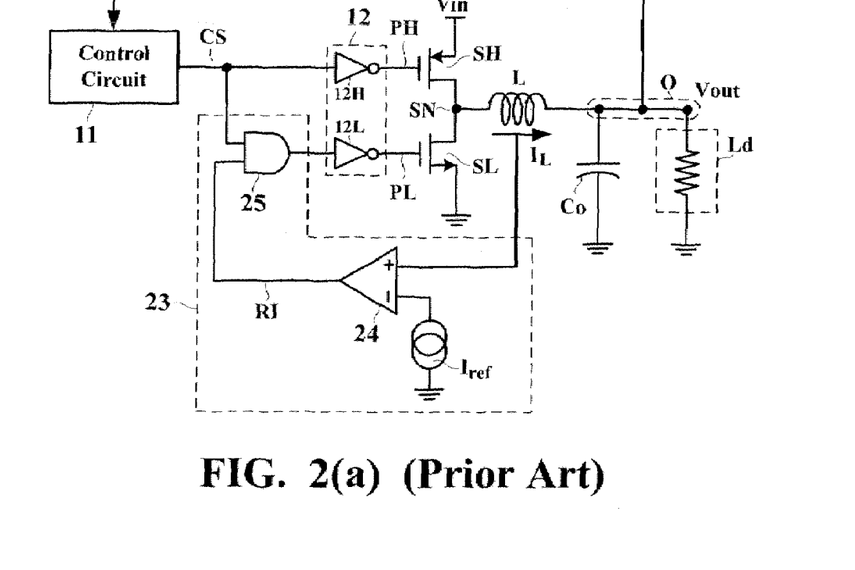
FIG. 2(a) is a circuit showing a first example of a conventional reverse current preventing circuit.

FIG. 2(a) is a circuit showing a first example of a conventional reverse current preventing circuit 23. The reverse current preventing circuit 23 has a current comparing circuit 24, a fixed reference current source $I_{reg}$, and an AND logical gate 25. The current comparing circuit 24 has a non-inverting input terminal for receiving the inductor current $I_L$, and an inverting input terminal for receiving a fixed reference current source $I_{ref}$. The AND logical gate 25 has a first input terminal for receiving the switch control signal CS, and a second input terminal for receiving a preventing signal RI output from the current comparing circuit 24. The output terminal of the AND logical gate 25 is coupled to the low-side driving circuit 12L so as to determine the low-side driving signal PL.

Figure 2B:
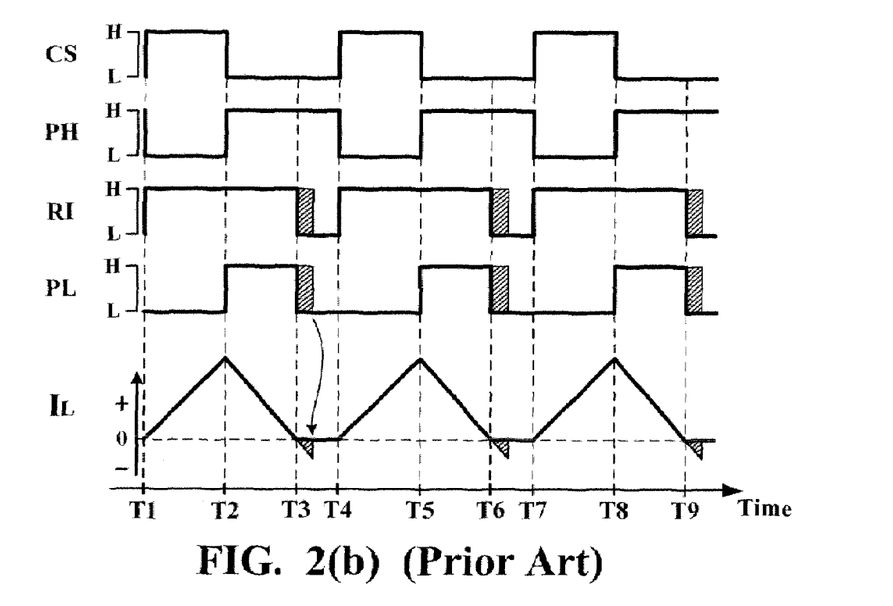
FIG. 2(b) is a waveform timing chart showing an operation of a first example of a conventional reverse current preventing circuit.

FIG. 2(b) is a waveform timing chart showing an operation of the conventional reverse current preventing circuit 23. Hereinafter is assumed that the fixed reference current $I_{ref}$ is set as zero. During a phase from time T1 to T2, the switch control signal CS is at the HIGH level and the preventing signal RI is at the HIGH level, such that the high-side and low-side driving signals PH and PL are both at the LOW level. Therefore, the high-side switch SH is turned ON and the low-side switch SL is turned OFF, such that the direction of the inductor current $I_L$ is positive and the absolute value of the inductor current $I_L$ gradually increases. At time T2, the switch control signal CS changes to the LOW level, such that the high-side and low-side driving signals PH and PL are both at the HIGH level. Therefore, the high-side switch SH is turned OFF and the low-side switch SL is turned ON, such that the absolute value of the inductor current $I_L$ gradually decreases. At time T3, the preventing signal RI changes to the LOW level since the absolute value of the inductor current $I_L$ decreases to zero, thereby causing the low-side driving signal PL to become the LOW level. Therefore, the low-side switch SL is turned OFF for preventing the reversal of the inductor current $I_L$.

However, there is actually a delay between the very moment when the absolute value of the inductor current $I_L$ decreases to zero and the very moment when the preventing signal RI is applied to the low-side switch SL since the operating speed of the current comparing circuit 24 is finite. In other words, the reversal of the inductor current $I_L$ will inevitably occur during such delay. The hatched regions shown in FIG. 2(b) indicate the incomplete prevention from the reversal of the inductor current $I_L$ due to the existence of the delay. Moreover, the operating speed of the current comparing circuit 24 changes along with the integrated circuit manufacturing process and the operating temperature. As a result, the delay caused by the current comparing circuit 24 is not a constant and therefore it is impossible to compensate the delay by using a fixed offset current.

Figure 3A:
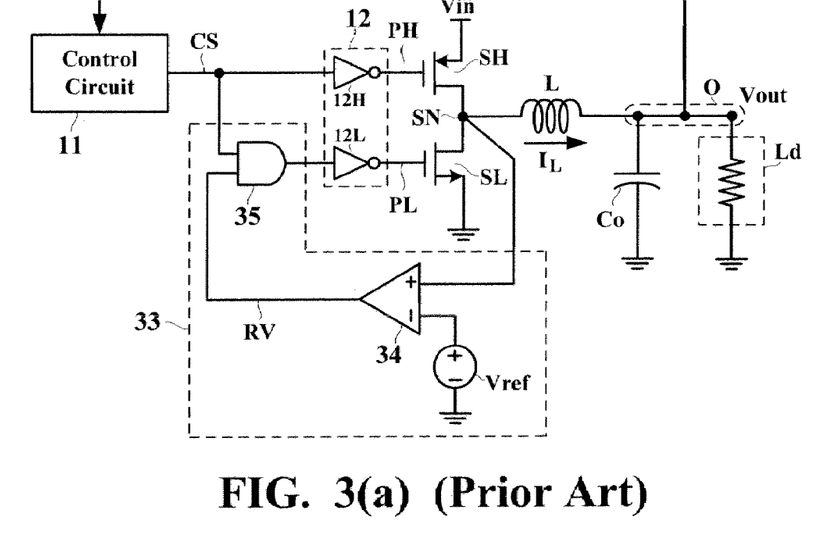
FIG. 3(a) is a circuit showing a second example of a conventional reverse current preventing circuit.

FIG. 3(a) is a circuit showing a second example of a conventional reverse current preventing circuit 33. The reverse current preventing circuit 33 has a voltage comparing circuit 34, a fixed reference voltage source $V_{ref}$, and an AND logical gate 35. The voltage comparing circuit 34 has a non-inverting input terminal for receiving a voltage $V_{SN}$ at the switch node SN, and an inverting input terminal for receiving a fixed reference voltage source $V_{ref}$. The AND logical gate 35 has a first input terminal for receiving the switch control signal CS, and a second input terminal for receiving a preventing signal RV output from the voltage comparing circuit 34. The output terminal of the AND logical gate 35 is coupled to the low-side driving circuit 12L so as to determine the low-side driving signal PL.

Figure 3B:
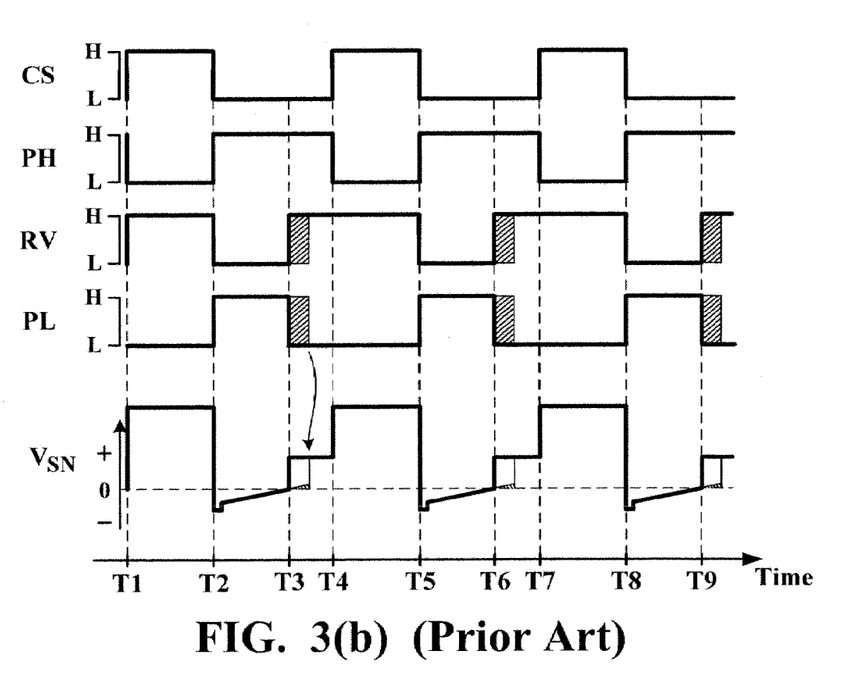
FIG. 3(b) is a waveform timing chart showing an operation of a second example of a conventional reverse current preventing circuit.

FIG. 3(b) is a waveform timing chart showing an operation of the conventional reverse current preventing circuit 33. Hereinafter is assumed that the fixed reference voltage $V_{ref}$ is set as zero. During a phase from time T1 to T2, the switch control signal CS is at the HIGH level and the preventing signal RV is at the HIGH level, such that the high-side and low-side driving signals PH and PL are both at the LOW level. Therefore, the high-side switch SH is turned ON and the low-side switch SL is turned OFF, such that the voltage $V_{SN}$ at the switch node SN is pulled up to approach the input voltage source $V_{in}$. At time T2, the switch control signal CS changes to the LOW level, such that the high-side and low-side driving signals PH and PL are both at the HIGH level. Therefore, the high-side switch SH is turned OFF and the low-side switch SL is turned ON, such that the inductor current $I_L$ flows from the ground potential through the low-side switch SL to the inductor L and the output terminal O, thereby causing the voltage $V_{SN}$ at the switch node SN to drop rapidly and even become negative in polarity. Afterwards, the voltage $V_{SN}$ at the switch node SN gradually approaches the ground potential because the absolute value of the inductor current $I_L$ gradually decreases. At time T3, the preventing signal RV changes to the HIGH level since the voltage $V_{SN}$ at the switch node SN reaches zero and become positive in polarity, thereby causing the low-side driving signal PL to become the LOW level. Therefore, the low-side switch SL is turned OFF for preventing the reversal of the inductor current $I_L$.

However, there is actually a delay between the very moment when the voltage $V_{SN}$ at the switch node SN reaches zero and the very moment when the preventing signal RV is applied to the low-side switch SL since the operating speed of the voltage comparing circuit 34 is finite. In other words, the reversal of the inductor current $I_L$ will inevitably occur during such delay. The hatched regions shown in FIG. 3(b) indicate the incomplete prevention from the reversal of the inductor current $I_L$ due to the existence of the delay. Moreover, the operating speed of the voltage comparing circuit 34 changes along with the integrated circuit manufacturing process and the operating temperature. As a result, the delay caused by the voltage comparing circuit 34 is not a constant and therefore it is impossible to compensate the delay by using a fixed offset voltage.

SUMMARY OF THE INVENTION

In view of the above-mentioned problems, an object of the present invention is to provide a reverse current preventing circuit, which is applied in a synchronous switching voltage converter, with an automatic correction of reference so as to accurately prevent the occurrence of the reverse current.

According to one aspect of the present invention, a reverse current preventing circuit is applied in a synchronous switching voltage converter. The synchronous switching voltage converter has a first switch, a second switch, and an inductor, three of which are coupled together to a switch node. When the first switch is turned ON and the second switch is turned OFF, an inductor current flowing through the inductor increases. When the first switch is turned OFF and the second switch is turned ON, the inductor current decreases. The reverse current preventing circuit comprises: a fixed reference current source, a correcting circuit, a variable reference current generating circuit, and a comparing circuit. Based on a comparison between the inductor current and the fixed reference current source, the correcting circuit generates a correcting signal. The variable reference current generating circuit generates a variable reference current signal, which is adjusted in accordance with the correcting signal. Based on a comparison between the inductor current and the variable reference current signal, the comparing circuit applies a preventing signal to turn off the second switch.

According to another aspect of the present invention, a reverse current preventing circuit is applied in a synchronous switching voltage converter. The synchronous switching voltage converter has a first switch, a second switch, and an inductor, three of which are coupled together to a switch node. When the first switch is turned ON and the second switch is turned OFF, an inductor current flowing through the inductor increases. When the first switch is turned OFF and the second switch is turned ON, the inductor current decreases. The reverse current preventing circuit comprises: a fixed reference voltage source, a correcting circuit, a variable reference voltage generating circuit, and a comparing circuit. Based on a comparison between a voltage at the switch node and the fixed reference voltage source, the correcting circuit generates a correcting signal. The variable reference voltage generating circuit generates a variable reference voltage signal, which is adjusted in accordance with the correcting signal. Based on a comparison between the voltage at the switch node and the variable reference voltage signal, the comparing circuit applies a preventing signal to turn off the second switch.

BRIEF DESCRIPTION OF THE DRAWINGS

The above-mentioned and other objects, features, and advantages of the present invention will become apparent with reference to the following descriptions and accompanying drawings, wherein.

DETAILED DESCRIPTION OF THE PREFERRED EMBODIMENTS

The preferred embodiments according to the present invention will be described in detail with reference to the drawings.

Figure 4:
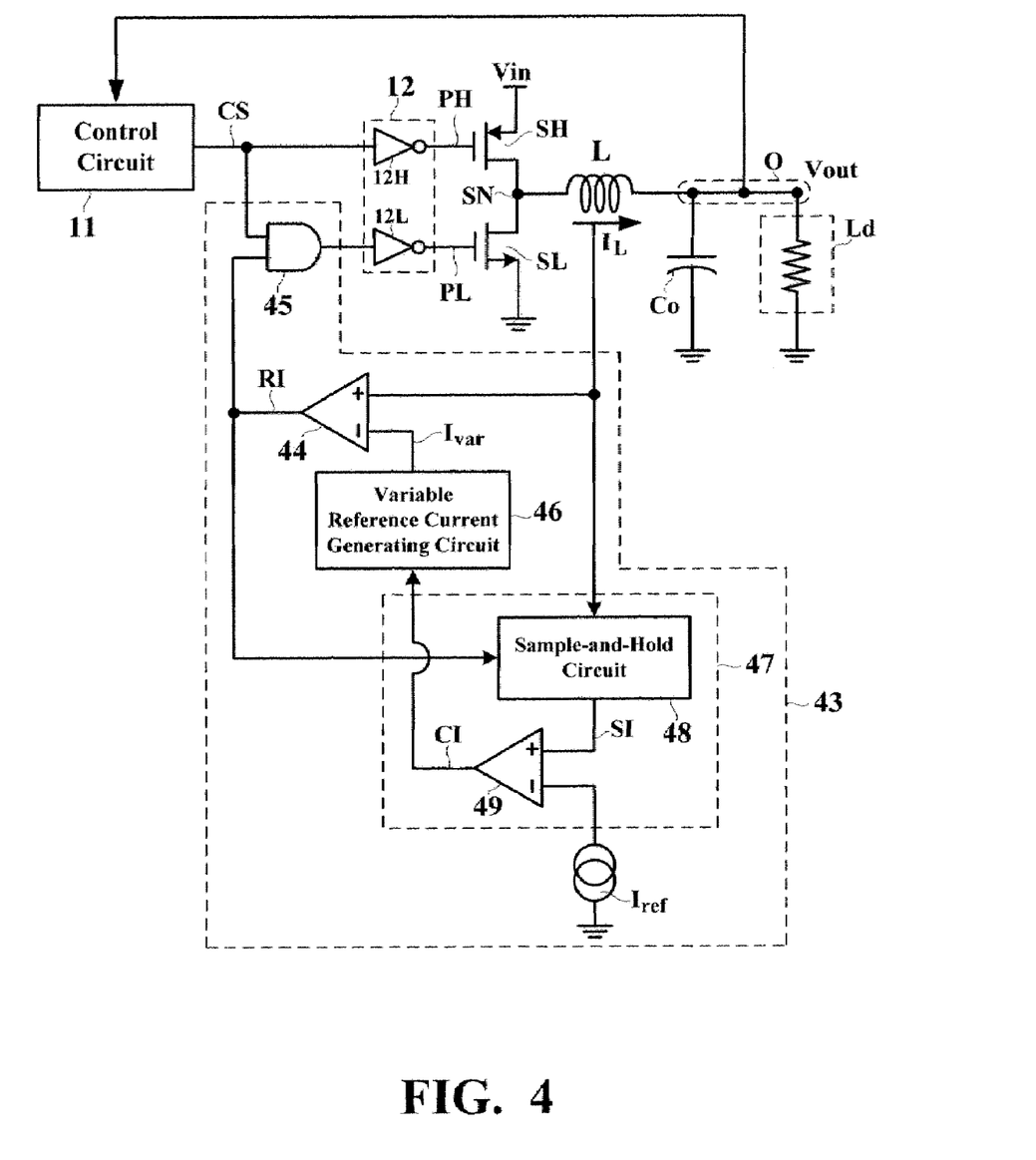
FIG. 4 is a circuit diagram showing a reverse current preventing circuit according to a first example of the present invention.

FIG. 4 is a circuit diagram showing a reverse current preventing circuit 43 according to a first example of the present invention. Referring to FIG. 4, the reverse current preventing circuit 43 has a current comparing circuit 44, an AND logical gate 45, a variable reference current generating circuit 46, a current correcting circuit 47, and a fixed reference current source $I_{ref}$. The current comparing circuit 44 has a non-inverting input terminal for receiving the inductor current $I_L$, and an inverting terminal for receiving a variable reference current signal $I_{var}$ output from the variable reference current generating circuit 46. The AND logical gate 45 has a first input terminal for receiving the switch control signal CS, and a second input terminal for receiving the preventing signal RI output from the current comparing circuit 44. The output terminal of the AND logical gate 45 is coupled to the low-side driving circuit 12L so as to determine the low-side driving signal PL.

More specifically, the variable reference current signal $I_{var}$ output from the variable reference current generating circuit 46 is adjusted in response to the current correcting circuit 47. The current correcting circuit 47 has a sample-and-hold circuit 48 and an auxiliary current comparing circuit 49. In response to the preventing signal RI, the sample-and-hold circuit 48 samples the inductor current $I_L$. Upon the very moment when the preventing signal RI changes from the HIGH level to the LOW level, i.e., when the low-side switch SL is turned OFF for preventing the current reversal, the sample-and-hold circuit 48 samples the inductor current $I_L$ as a current sample signal SI. The auxiliary current comparing circuit 49 has a non-inverting input terminal for receiving the current sample signal SI and an inverting input terminal for receiving the fixed reference current source $I_{ref}$. For example, the fixed reference current source $I_{ref}$ may be set as zero. Based on the comparison between the current sample signal SI and the fixed reference current source $I_{ref}$, the auxiliary current comparing circuit 49 applies a current correcting signal CI to the variable reference current generating circuit 46.

In response to the current correcting signal CI, the variable reference current generating circuit 46 adjusts the variable reference current signal $I_{var}$ to be output. When the current sample signal SI is larger than the fixed reference current source $I_{ref}$, the current correcting signal CI is at the HIGH level. That is, at the very moment when the low-side switch SL is turned OFF, the inductor current $I_L$ is larger than the fixed reference current source $I_{ref}$. In other words, the low-side switch SL is turned OFF earlier than the occurrence of the reversal of the inductor current $I_L$. For this reason, the variable reference current generating circuit 46 must reduce the variable reference current signal $I_{var}$, thereby causing the event of turning OFF the low-side switch SL to take place at a later time. When the current sample signal SI is smaller than the fixed reference current source $I_{ref}$, the current correcting signal CI is at the LOW level. That is, at the very moment when the low-side switch is turned OFF, the inductor current $I_L$ is smaller than the fixed reference current source $I_{ref}$. In other words, the low-side switch SL is turned OFF later than the occurrence of the reversal of the inductor current $I_L$. For this reason, the variable reference current generating circuit 46 must raise the variable reference current signal $I_{var}$, thereby causing the event of turning OFF the low-side switch SL to take place at an earlier time.

Although the operating speed of the current comparing circuit 44 is finite and changes along with the integrated circuit manufacturing process and the operating temperature, the current correcting circuit 47 according to the present invention directly detects the inductor current $I_L$ and generates the current correcting signal CI based on the comparison between the inductor current $I_L$ and the fixed reference current source ref. Afterwards, in response to the current correcting signal CI, the variable reference current generating circuit 46 is able to automatically adjust the variable reference current signal $I_{var}$ to be generated. In other words, the corrected variable reference current signal $I_{var}$ has taken into consideration the delay caused by the current comparing circuit 44. Therefore, the reverse current preventing circuit 43 according to the present invention effectively prevents the reversal of the inductor current $I_L$.

Figure 5:
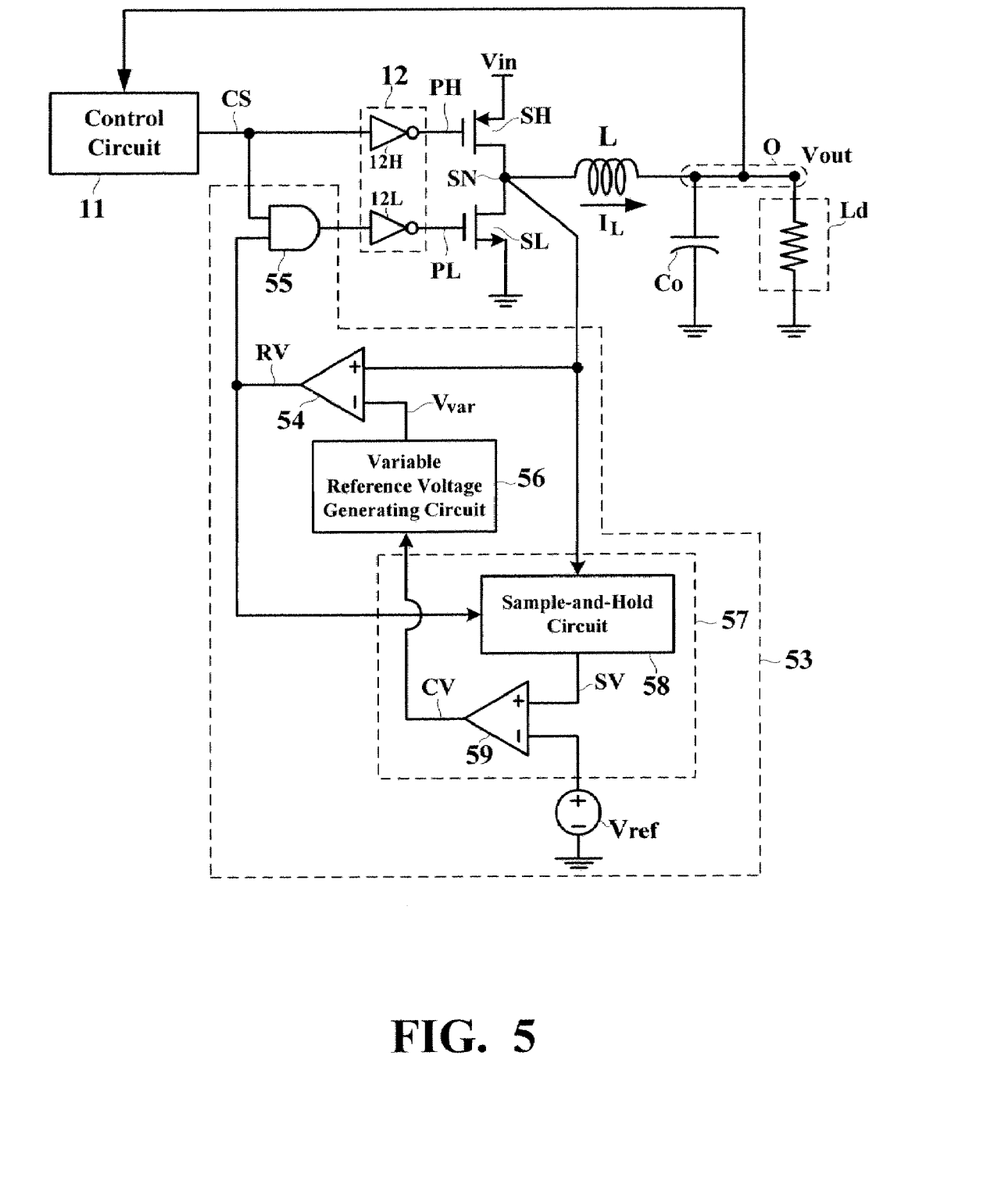
FIG. 5 is a circuit diagram showing a reverse current preventing circuit according to a second example of the present invention.

FIG. 5 is a circuit diagram showing a reverse current preventing circuit 53 according to a second example of the present invention. Referring to FIG. 5, the reverse current preventing circuit 53 has a voltage comparing circuit 54, an AND logical gate 55, a variable reference voltage generating circuit 56, a voltage correcting circuit 57, and a fixed reference voltage source $V_{ref}$. The voltage comparing circuit 54 has a non-inverting input terminal for the voltage $V_{SN}$ at the switch node SN, and an inverting terminal for receiving a variable reference voltage signal $V_{var}$ output from the variable reference voltage generating circuit 56. The AND logical gate 55 has a first input terminal for receiving the switch control signal CS, and a second input terminal for receiving the preventing signal RV output from the voltage comparing circuit 54. The output terminal of the AND logical gate 55 is coupled to the low-side driving circuit 12L so as to determine the low-side driving signal PL.

More specifically, the variable reference voltage signal $V_{var}$ output from the variable reference voltage generating circuit 56 is adjusted in response to the voltage correcting circuit 57. The voltage correcting circuit 57 has a sample-and-hold circuit 58 and an auxiliary voltage comparing circuit 59. In response to the preventing signal RV, the sample-and-hold circuit 58 samples the voltage $V_{SN}$ at the switch node SN. Upon the very moment when the preventing signal RV changes from the LOW level to the HIGH level, i.e., when the low-side switch SL is turned OFF for preventing the current reversal, the sample-and-hold circuit 58 samples the voltage $V_{SN}$ at the switch node SN as a voltage sample signal SV. The auxiliary voltage comparing circuit 59 has a non-inverting input terminal for receiving the voltage sample signal SV and an inverting input terminal for receiving the fixed reference voltage source $V_{ref}$. For example, the fixed reference voltage source $V_{ref}$ may be set as zero. Based on the comparison between the voltage sample signal SV and the fixed reference voltage source $V_{ref}$, the auxiliary voltage comparing circuit 59 applies a voltage correcting signal CV to the variable reference voltage generating circuit 56.

In response to the voltage correcting signal CV, the variable reference voltage generating circuit 56 adjusts the variable reference voltage signal $V_{var}$ to be output. When the voltage sample signal SV is larger than the fixed reference voltage source $V_{ref}$, the voltage correcting signal CV is at the HIGH level. That is, at the very moment when the low-side switch SL is turned OFF, the voltage $V_{SN}$ at the switch node SN is larger than the fixed reference voltage source $V_{ref}$. In other words, the low-side switch SL is turned OFF later than the occurrence of the reversal of the inductor current $I_L$. Fore this reason, the variable reference voltage generating circuit 56 must reduce the variable reference voltage signal $V_{var}$, thereby causing the event of turning OFF the low-side switch SL to take place at an earlier time. When the voltage sample signal SV is smaller than the fixed reference voltage source $V_{ref}$, the voltage correcting signal CV is at the LOW level. That is, at the very moment when the low-side switch SL is turned OFF, the voltage $V_{SN}$ at the switch node SN is smaller than the fixed reference voltage source $V_{ref}$. In other words, the low-side switch SL is turned OFF earlier than the occurrence of the reversal of the inductor current $I_L$. For this reason, the variable reference voltage generating circuit 56 must raise the variable reference voltage signal $V_{var}$, thereby causing the event of turning OFF the low-side switch SL to take place at a later time.

Although the operating speed of the current comparing circuit 54 is finite and changes along with the integrated circuit manufacturing process and the operating temperature, the voltage correcting circuit 57 according to the present invention directly detects the voltage $V_{SN}$ at the switch node SN and generates the voltage correcting signal CV based on the comparison between the voltage $V_{SN}$ at the switch node SN and the fixed reference voltage source $V_{ref}$. Afterwards, in response to the voltage correcting signal CV, the variable reference voltage generating circuit 57 is able to automatically adjust the variable reference voltage signal $V_{var}$ to be generated. In other words, the corrected variable reference voltage signal $V_{var}$ has taken into consideration the delay caused by the voltage comparing circuit 54. Therefore, the reverse current preventing circuit 53 according to the present invention effectively prevents the reversal of the inductor current $I_L$.

It should be noted that although the above-described embodiments refer only to the buck type switching voltage converter, the reverse current preventing circuit according to the present invention may also be applied to a boost type switching voltage converter and any of other types of synchronous switching voltage converters.

Figure 6:
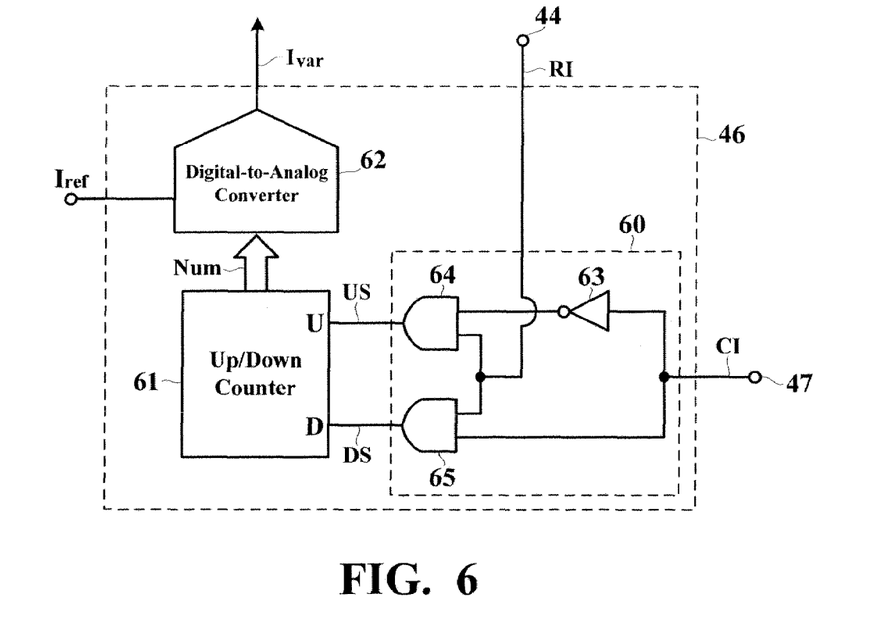
FIG. 6 is a circuit diagram showing a variable reference current generating circuit according to the present invention.

FIG. 6 is a circuit diagram showing a variable reference current generating circuit 46 according to the present invention. Referring to FIG. 6, the variable reference current generating circuit 46 has an up/down determining circuit 60, an up/down counter 61, and a digital-to-analog converter 62. The up/down determining circuit 60 receives the current correcting signal CI from the current correcting circuit 47, and determines whether to output an up signal US or to output a down signal DS based on the current correcting signal CI.

As described above with reference to FIG. 4, when the preventing signal RI generated from the current comparing circuit 44 changes to the LOW level, i.e., the current reversal occurs, the sample-and-hold circuit 48 is activated by the preventing signal RI to sample the inductor current $I_L$. In contrast, the up/down determining circuit 60 is forced to stop operating by the preventing signal RI of the LOW level. After the preventing signal RI returns to the HIGH level, the up/down determining circuit 60 is allowed to operate for determining whether to output the up signal US or to output the down signal DS based on the current correcting signal CI. With the currently-corrected variable reference current signal $I_{var}$, the current comparing circuit 44 is able to more accurately detect the next-time occurrence of the current reversal.

The up/down determining circuit 60 is formed by an inverter 63 and two AND logical gates 64 and 65, coupled together as shown in FIG. 6. When the current correcting signal CI is at the HIGH level, the down signal DS generated from the up/down determining circuit 60 is at the HIGH level such that the counting value Num of the up/down counter 61 decreases. When the current correcting signal CI is at the LOW level, the up signal US generated from the up/down determining circuit 60 is at the HIGH level such that the counting value Num of the up/down counter 61 increases. In response to the counting value Num of the up/down counter 61, the digital-to-analog converter 62 adjusts the fixed reference current source $I_{ref}$ so as to generate the corresponding variable reference current signal $I_{var}$. The larger the counting value Num, the larger the corresponding variable reference current signal $I_{var}$.

Figure 7:
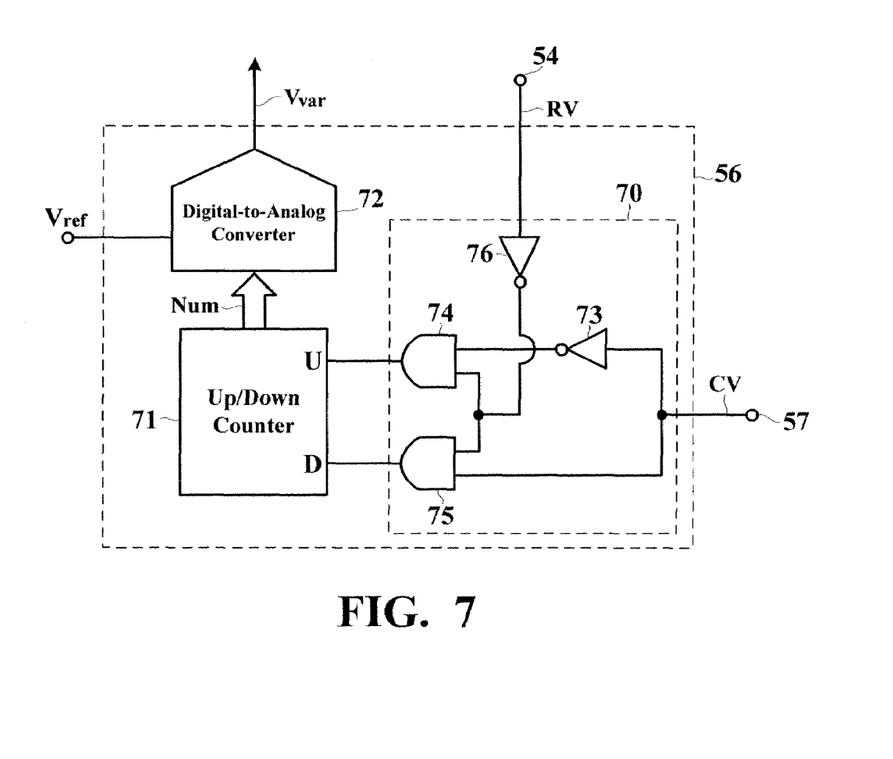
FIG. 7 is a circuit diagram showing a variable reference voltage generating circuit according to the present invention.

FIG. 7 is a circuit diagram showing a variable reference voltage generating circuit 56 according to the present invention. Referring to FIG. 7, the variable reference voltage generating circuit 56 has an up/down determining circuit 70, an up/down counter 71, and a digital-to-analog converter 72. The up/down determining circuit 70 receives the voltage correcting signal CV from the voltage correcting circuit 57, and determines whether to output an up signal US or to output a down signal DS based on the voltage correcting signal CV.

As described above with reference to FIG. 5, when the preventing signal RV generated from the voltage comparing circuit 54 changes to the HIGH level, i.e., the current reversal occurs, the sample-and-hold circuit 58 is activated by the preventing signal RV to sample the voltage $V_{SN}$ at the switch node SN. In contrast, the up/down determining circuit 70 is forced to stop operating by the preventing signal RV of the HIGH level. After the preventing signal RV returns to the LOW level, the up/down determining circuit 70 is allowed to operate for determining whether to output the up signal US or to output the down signal DS based on the current correcting signal CI. With the currently-corrected variable reference voltage signal $V_{var}$, the voltage comparing circuit 54 is able to more accurately detect the next-time occurrence of the current reversal.

The up/down determining circuit 70 is formed by two inverters 73 and 76 and two AND logical gates 74 and 75, coupled together as shown in FIG. 7. When the voltage correcting signal CV is at the HIGH level, the down signal DS generated from the up/down determining circuit 70 is at the HIGH level such that the counting value Num of the up/down counter 71 decreases. When the voltage correcting signal CV is at the LOW level, the up signal US generated from the up/down determining circuit 70 is at the HIGH level such that the counting value Num of the up/down counter 71 increases. In response to the counting value Num of the up/down counter 71, the digital-to-analog converter 72 adjusts the fixed reference current source $V_{ref}$ so as to generate the corresponding variable reference voltage signal $V_{var}$. The larger the counting value Num, the larger the corresponding variable reference voltage signal $V_{var}$.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A reverse current preventing circuit, applied in a synchronous switching voltage converter having a first switch, a second switch, and an inductor, three of which are coupled together to a switch node, such that an inductor current flowing through the inductor increases when the first switch is turned ON and the second switch is turned OFF, and the inductor current decreases when the first switch is turned OFF and the second switch is turned ON, the reverse current preventing circuit comprising:
  a fixed reference current source;
  a correcting circuit for generating a correcting signal based on a comparison between the inductor current and the fixed reference current source;
  a variable reference current generating circuit for generating a variable reference current signal, which is adjusted in accordance with the correcting signal; and
  a comparing circuit for applying a preventing signal based on a comparison between the inductor current and the variable reference current signal to turn off the second switch.

2. The circuit according to claim 1, wherein:
when the correcting circuit detects that the inductor current is larger than the fixed reference current source, the variable reference current generating circuit reduces the variable reference current signal in response to the correcting signal.

3. The circuit according to claim 1, wherein:
when the correcting circuit detects that the inductor current is smaller than the fixed reference current source, the variable reference current generating circuit raises the variable reference current signal in response to the correcting signal.

4. The circuit according to claim 1, wherein:
the correcting circuit includes:
  a sample-and-hold circuit for generating a current sample signal representative of the inductor current at a moment when the comparing circuit applies the preventing signal, and
  an auxiliary comparing circuit for generating the correcting signal based on a comparison between the current sample signal and the fixed reference current source.

5. The circuit according to claim 1, wherein:
the variable reference current generating circuit includes:
  a determining circuit for generating an up signal or a down signal in response to the correcting signal, wherein the determining circuit generates the up signal when the correcting signal is at a first level, and generates the down signal when the correcting signal is at a second level;
  a counter for generating a counting value, wherein the counting value increases when the counter receives the up signal, and decreases when the counter receives the down signal; and
  a digital-to-analog circuit for generating the variable reference current signal in accordance with the counting value.

6. A synchronous switching voltage converter, comprising:
  a first switch;
  a second switch;
  an inductor, wherein the first switch, the second switch, and the inductor are coupled together to a switch node, such that an inductor current flowing through the inductor increases when the first switch is turned ON and the second switch is turned OFF, and the inductor current decreases when the first switch is turned OFF and the second switch is turned ON; and
  a reverse current preventing circuit for applying a preventing signal to turn off the second switch, characterized in that the reverse current preventing circuit comprises:
  a fixed reference current source;
  a correcting circuit for generating a correcting signal based on a comparison between the inductor current and the fixed reference current source;
  a variable reference current generating circuit for generating a variable reference current signal, which is adjusted in accordance with the correcting signal; and
  a comparing circuit for applying a preventing signal based on a comparison between the inductor current and the variable reference current signal to turn off the second switch.

7. The synchronous switching voltage converter according to claim 6, wherein:
when the correcting circuit detects that the inductor current is larger than the fixed reference current source, the variable reference current generating circuit reduces the variable reference current signal in response to the correcting signal.

8. The synchronous switching voltage converter according to claim 6, wherein:
when the correcting circuit detects that the inductor current is smaller than the fixed reference current source, the variable reference current generating circuit raises the variable reference current signal in response to the correcting signal.

9. The synchronous switching voltage converter according to claim 6, wherein:
the correcting circuit includes:
  a sample-and-hold circuit for generating a current sample signal representative of the inductor current at a moment when the comparing circuit applies the preventing signal, and
  an auxiliary comparing circuit for generating the correcting signal based on a comparison between the current sample signal and the fixed reference current source.

10. The synchronous switching voltage converter according to claim 6, wherein:
the variable reference current generating circuit includes:
  a determining circuit for generating an up signal or a down signal in response to the correcting signal, wherein the determining circuit generates the up signal when the correcting signal is at a first level, and generates the down signal when the correcting signal is at a second level;
  a counter for generating a counting value, wherein the counting value increases when the counter receives the up signal, and decreases when the counter receives the down signal; and
  a digital-to-analog circuit for generating the variable reference current signal in accordance with the counting value.

11. A reverse current preventing circuit, applied in a synchronous switching voltage converter having a first switch, a second switch, and an inductor, three of which are coupled together to a switch node, such that an inductor current flowing through the inductor increases when the first switch is turned ON and the second switch is turned OFF, and the inductor current decreases when the first switch is turned OFF and the second switch is turned ON, the reverse current preventing circuit comprising:
  a fixed reference voltage source;
  a correcting circuit for generating a correcting signal based on a comparison between a voltage at the switch node and the fixed reference voltage source;

a variable reference voltage generating circuit for generating a variable reference voltage signal, which is adjusted in accordance with the correcting signal; and a comparing circuit for applying a preventing signal based on a comparison between the voltage at the switch node and the variable reference voltage signal to turn off the second switch.

12. The circuit according to claim 11, wherein:

when the correcting circuit detects that the voltage at the switch node is larger than the fixed reference voltage source, the variable reference voltage generating circuit reduces the variable reference voltage signal in response to the correcting signal.

13. The circuit according to claim 11, wherein:

when the correcting circuit detects that the voltage at the switch node is smaller than the fixed reference voltage source, the variable reference voltage generating circuit raises the variable reference voltage signal in response to the correcting signal.

14. The circuit according to claim 11, wherein:

the correcting circuit includes:

a sample-and-hold circuit for generating a voltage sample signal representative of the voltage at the switch node at a moment when the comparing circuit applies the preventing signal, and an auxiliary comparing circuit for generating the correcting signal based on a comparison between the voltage sample signal and the fixed reference voltage source.

15. The circuit according to claim 11, wherein:

the variable reference voltage generating circuit includes:

a determining circuit for generating an up signal or a down signal in response to the correcting signal, wherein the determining circuit generates the up signal when the correcting signal is at a first level, and generates the down signal when the correcting signal is at a second level;

a counter for generating a counting value, wherein the counting value increases when the counter receives the up signal, and decreases when the counter receives the down signal; and a digital-to-analog circuit for generating the variable reference voltage signal in accordance with the counting value.

16. A synchronous switching voltage converter, comprising:

a first switch;

a second switch;

an inductor, wherein the first switch, the second switch, and the inductor are coupled together to a switch node, such that an inductor current flowing through the inductor increases when the first switch is turned ON and the second switch is turned OFF, and the inductor current decreases when the first switch is turned OFF and the second switch is turned ON; and a reverse current preventing circuit for applying a preventing signal to turn off the second switch, characterized in that the reverse current preventing circuit comprises:

a fixed reference voltage source;

a correcting circuit for generating a correcting signal based on a comparison between a voltage at the switch node and the fixed reference voltage source;

a variable reference voltage generating circuit for generating a variable reference voltage signal, which is adjusted in accordance with the correcting signal; and a comparing circuit for applying a preventing signal based on a comparison between the voltage at the switch node and the variable reference voltage signal to turn off the second switch.

17. The synchronous switching voltage converter according to claim 16, wherein:

when the correcting circuit detects that the voltage at the switch node is larger than the fixed reference voltage source, the variable reference voltage generating circuit reduces the variable reference voltage signal in response to the correcting signal.

18. The synchronous switching voltage converter according to claim 16, wherein:

when the correcting circuit detects that the voltage at the switch node is smaller than the fixed reference voltage source, the variable reference voltage generating circuit raises the variable reference voltage signal in response to the correcting signal.

19. The synchronous switching voltage converter according to claim 16, wherein:

the correcting circuit includes:

a sample-and-hold circuit for generating a voltage sample signal representative of the voltage at the switch node at a moment when the comparing circuit applies the preventing signal, and an auxiliary comparing circuit for generating the correcting signal based on a comparison between the voltage sample signal and the fixed reference voltage source.

20. The synchronous switching voltage converter according to claim 16, wherein:

the variable reference voltage generating circuit includes:

a determining circuit for generating an up signal or a down signal in response to the correcting signal, wherein the determining circuit generates the up signal when the correcting signal is at a first level, and generates the down signal when the correcting signal is at a second level;

a counter for generating a counting value, wherein the counting value increases when the counter receives the up signal, and decreases when the counter receives the down signal; and a digital-to-analog circuit for generating the variable reference voltage signal in accordance with the counting value.

* * * * *